(12) United States Patent
Uchiyama et al.

(10) Patent No.: US 7,953,321 B2
(45) Date of Patent: *May 31, 2011

(54) OPTICAL TRANSMISSION EQUIPMENT AND OPTICAL ADD-DROP MULTIPLEXER

(75) Inventors: Yasuhiro Uchiyama, Yokohama (JP); Hiroyuki Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/724,881

(22) Filed: Mar. 16, 2010

(65) Prior Publication Data

US 2010/0172644 A1    Jul. 8, 2010

Related U.S. Application Data

(63) Continuation of application No. 11/752,331, filed on May 23, 2007, now Pat. No. 7,697,845.

(30) Foreign Application Priority Data

Jun. 23, 2006 (JP) .................................. 2006-173915

(51) Int. Cl.
*H04J 14/02* (2006.01)
*H04B 10/16* (2006.01)
(52) U.S. Cl. .......................................... 398/37; 398/177
(58) Field of Classification Search .................... 398/37, 398/177
See application file for complete search history.

(56) References Cited

U.S. PATENT DOCUMENTS 6,469,824 B2    10/2002   Sasaki
7,697,845 B2 *   4/2010   Uchiyama et al. ............... 398/83

FOREIGN PATENT DOCUMENTS

| JP | 04-324335 | 11/1992 |
|----|-----------|---------|
| JP | 05-083201 | 4/1993 |
| JP | 09-200130 | 7/1997 |
| JP | 2001-144687 | 5/2001 |
| JP | 2002-050816 | 2/2002 |
| JP | 2002-335214 | 11/2002 |

* cited by examiner

*Primary Examiner* — Leslie Pascal
(74) *Attorney, Agent, or Firm* — Antonelli, Terry, Stout & Kraus, LLP.

(57) ABSTRACT

An optical transmission equipment includes an optical amplifier that is coupled to an optical transmission path and amplifies a first optical signal which is received from the optical transmission path, a first controller that controls the optical amplifier depending on a first optical power of output light from the optical amplifier and a second optical power of reflecting light to the optical amplifier, an optical coupler that branches a second optical signal from the optical amplifier into a first output and a second output, an optical demultiplexer that demultiplexes the first output of the optical coupler, an optical switch or attenuator that receives the second output of the optical coupler, and a second controller that controls the optical switch or attenuator depending on a third optical power of output light from the optical switch or attenuator and a fourth optical power of reflecting light to the optical switch or attenuator.

12 Claims, 6 Drawing Sheets

OPTICAL TRANSMISSION EQUIPMENT AND OPTICAL ADD-DROP MULTIPLEXER

CROSS REFERENCE TO RELATED APPLICATION

This application is a continuation application of U.S. application Ser. No. 11/752,331, filed May 23, 2007, now U.S. Pat. No. 7,697,845, the contents of which are incorporated herein by reference.

CLAIM OF PRIORITY

The present application claims priority from Japanese patent application serial no. 2006-173915, filed on Jun. 23, 2006, the content of which is hereby incorporated by reference into this application.

BACKGROUND OF THE INVENTION

The present invention relates to optical transmission equipment and an optical add-drop multiplexer (OADM) that use a wavelength multiplexing technique. More particularly, the invention relates to optical transmission equipment and an optical add-drop multiplexer that have excellent maintainability.

With the increasing capacity of data system communication represented by the Internet technology, a rapid growth in data volume and an increase in the associated transmission capacity are expected in optical transmission systems. In order to meet such demands, the wavelength multiplexing technique is applied to perform communication by bundling plural signal lights of different wavelengths through one optical fiber. Recently, there is being established a communication network using optical add-drop multiplexers that can drop and add optical signals for each wavelength at plural locations, in addition to transmit large volume of data between two separate sites by means of the wavelength multiplexing technique.

Figure 1:
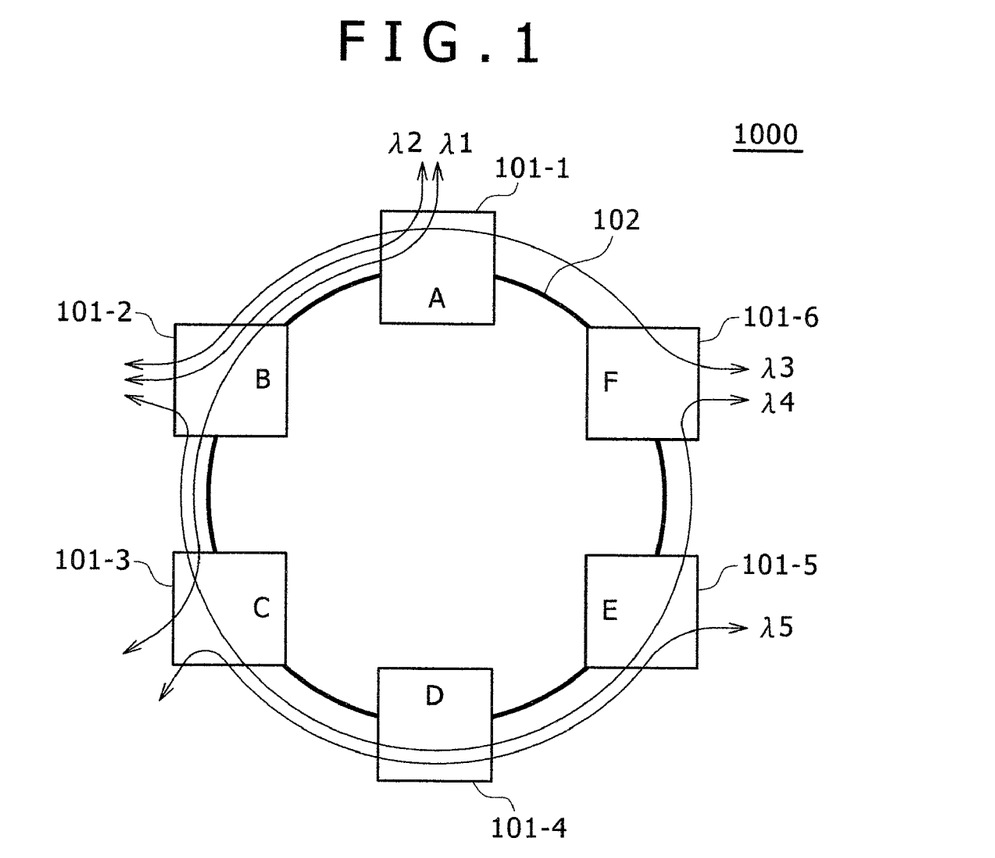
FIG. 1 is a block diagram of an optical transmission network using an optical add-drop multiplexer.

FIG. 1 shows a block diagram of an optical transmission network using optical add-drop multiplexers. An optical transmission network 1000 includes six optical add-drop multiplexers 101 that are connected in a ring configuration through an optical fiber transmission line 102. The optical add-drop multiplexer 101 selects whether to add and drop plural optical signals of different wavelengths for each wavelength, or whether to transmit the optical signals through the multiplexer. In FIG. 1, there are shown the start points and end points of five optical signals λ1 (lambda 1) to λ5 each having different wavelengths, all of which are added and dropped at nodes that can be freely selected.

Figure 2:
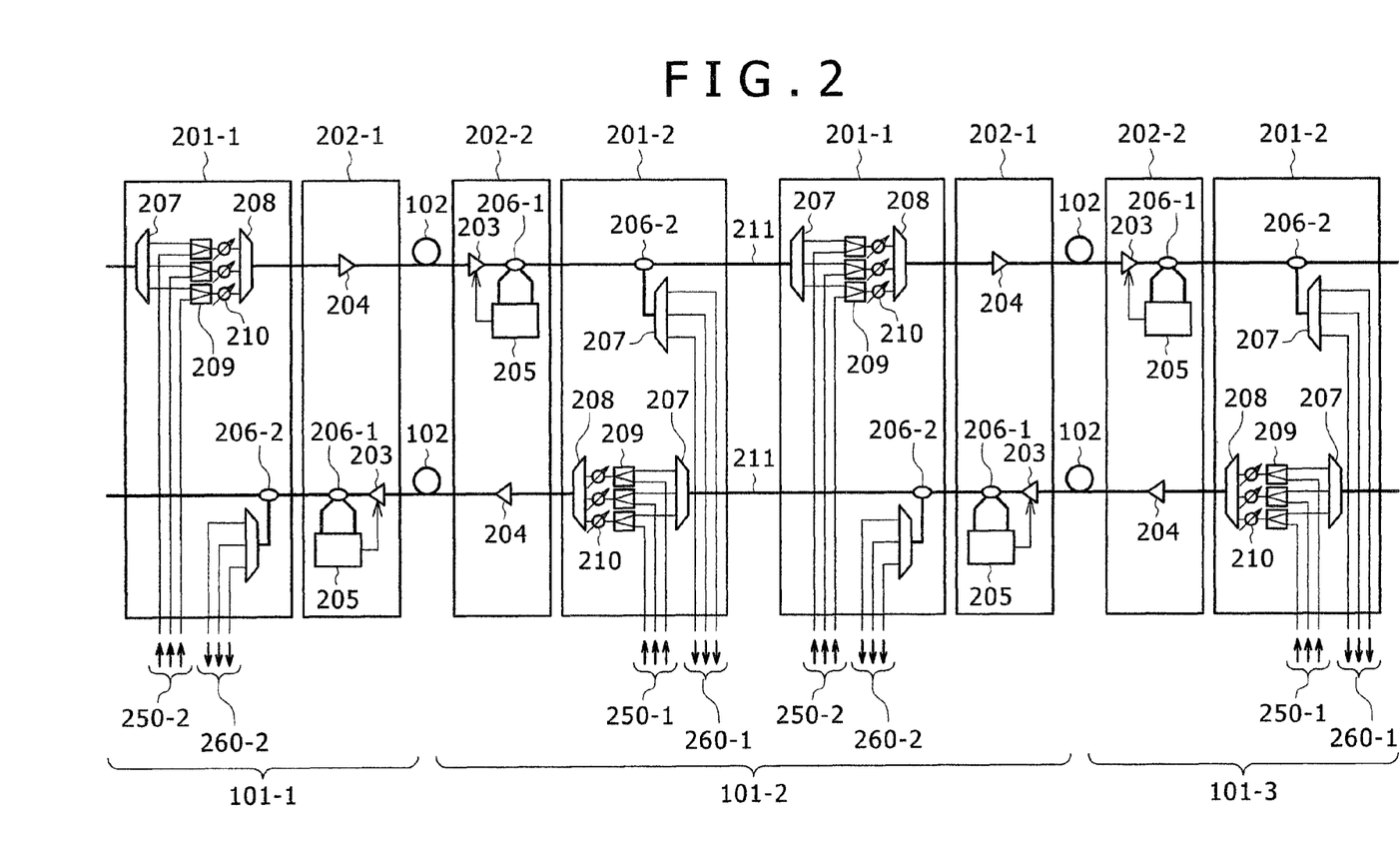
FIG. 2 is a block diagram showing a principal part of the optical transmission network.

FIG. 2 is a block diagram showing a principal part of the optical transmission network. FIG. 2 shows the device configuration of a portion of the optical network shown in FIG. 1, from an optical add-drop multiplexer 101-1, to an optical add-drop multiplexer 101-2, and to an optical add-drop multiplexer 101-3. However, in FIG. 2, there are only shown an East side function part for the optical add-drop multiplexer 101-1 and a West side function part for the optical add-drop multiplexer 101-3. The optical add-drop multiplexer 101 includes an optical amplification function part (West) 202-2, an optical amplification function part (East) 202-1, an optical add-drop function part (West) 201-2, and an optical add-drop function part (East) 201-1. The optical amplification function part 202 includes: a reception optical amplifier 203 for amplifying an input optical signal from the optical fiber transmission line 102 and transmitting the amplified signal to the optical add-drop function part 201; and a transmission optical amplifier 204 for amplifying an input optical signal from the optical add-drop function part 201 and transmitting the amplified signal to the optical fiber transmission line 102. The optical add-drop function part 201 includes: an optical drop part having an optical coupler 206-2 and an optical demultiplexer 207; and an optical transmission/add selection part having the optical demultiplexer 207, an optical multiplexer 208, an optical switch 209, and a variable optical attenuator (VOA) 210.

Taking an example of the optical signal flow in a direction from West to East in the optical add-drop multiplexer 101-2, the operation of the entire optical add-drop multiplexer will be described. A received optical signal from the optical add-drop multiplexer 101-1 is amplified by the reception optical amplifier 203 of the optical amplification function part (West) 202-1 of the optical add-drop multiplexer 101-2. Then the amplified signal is transmitted to the optical add-drop function part (West) 201-2. Incidentally, the operations of an optical coupler 206-1 and a laser safety part 205 will be described below with reference to FIG. 4. In the optical add-drop function part (West) 201-2, the optical signal is split into two halves by the optical coupler 206-2, one of which is further branched into lights at each wavelength by the optical demultiplexer 207 and is output from a drop optical port 260-2. The other optical signal is transmitted as it is to the optical add-drop function part (East) 201-1 through an optical fiber 211 connecting the optical add-drop function parts. In the optical add-drop function part (East) 201-1, the optical signal is branched into optical signals at different wavelengths by the optical demultiplexer 207, and the signals are input to the optical switch 209. The optical switch 209 selects and outputs either the transmitted optical signal from West or the added optical signal from an add optical port 250-2 of the optical add-drop multiplexer 101-2. The variable optical attenuator 210 is provided in the later stage of the optical switch 209 to equally adjust all the optical power levels of each of the wavelengths. The light whose optical power levels are adjusted by the variable optical attenuator 210 is wavelength multiplexed by the optical multiplexer 208, and is transmitted to the optical amplification function part (East) 202-1. In the optical amplification function part (East) 202-1, the wavelength multiplexed light is amplified by the transmission optical amplifier 204 and is transmitted to the optical fiber transmission line 102.

Figure 3:
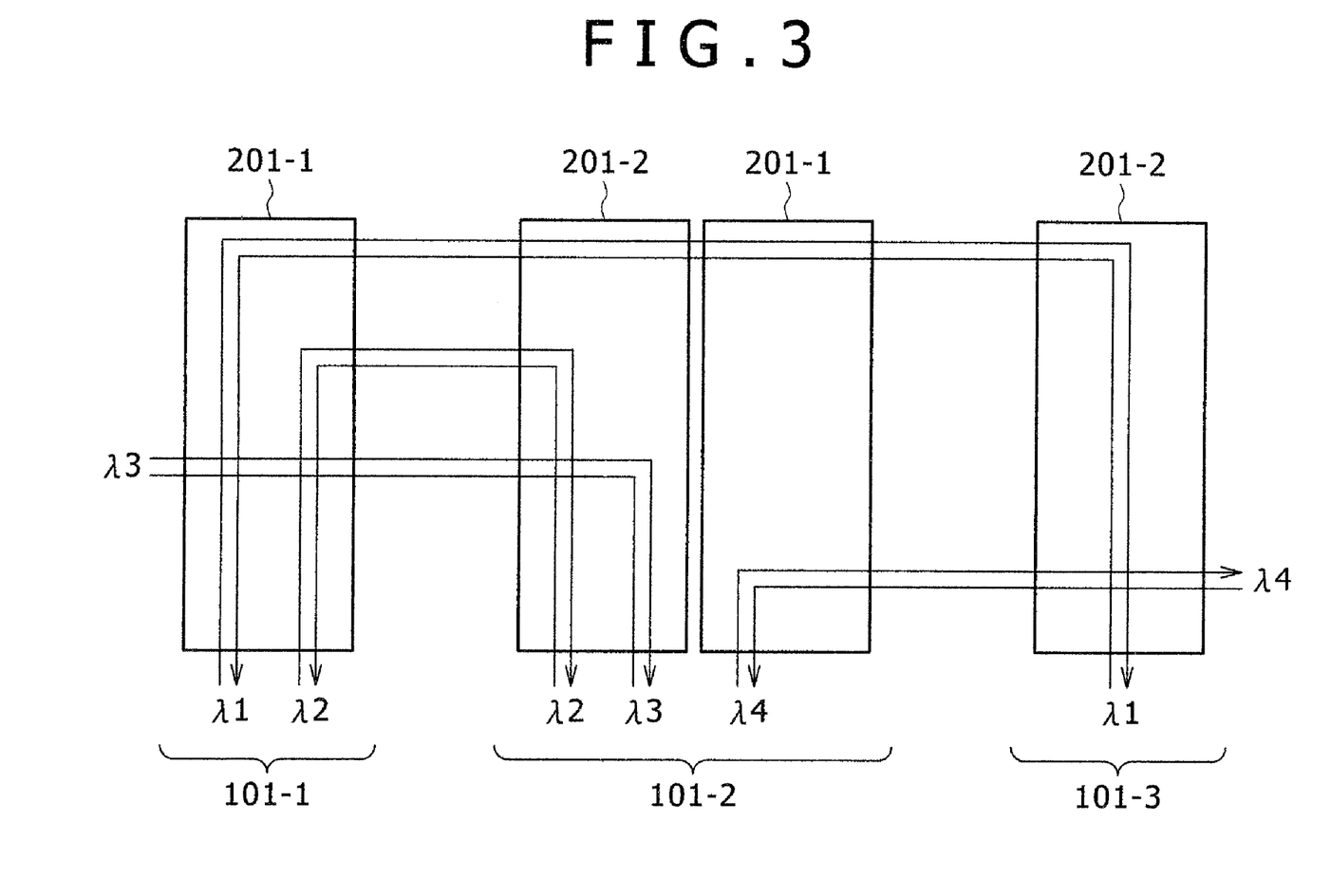
FIG. 3 is a view illustrating the main signal flow in the optical transmission network.

FIG. 3 is a view illustrating the optical signal flow from the optical add-drop multiplexer 101-1, to the optical add-drop multiplexer 101-2, and to the optical add-drop multiplexer 101-3 in the optical network of FIG. 1. The optical signal λ1 is dropped and added in the optical add-drop function part (East) 201-1 of the optical add-drop multiplexer 101-1 and in the optical add-drop function part (West) 201-2 of the optical add-drop multiplexer 101-3, while being transmitted through the optical add-drop multiplexer 101-2. Similarly, the optical signal λ2 is dropped and added in the optical add-drop multiplexers A, B. The optical signal λ3 is transmitted through the optical add-drop multiplexer 101-1, while being dropped and added in the optical add-drop multiplexer 101-2. The optical signal λ4 is dropped and added in the optical add-drop multiplexer 101-2, while being transmitted through the optical add-drop multiplexer 101-3.

In FIG. 2, the reception optical amplifier 203 of each of the optical amplification function parts 202-1, 202-2 has a function of compensating the optical power reduction including not only a loss in the optical fiber transmission line but also a loss in the optical add-drop function part. Consequently the optical power level is high. Assuming that the optical power level for one wavelength is +6 dBm in the reception optical amplifier 203, the optical power level for 40 wavelengths reaches +22 dBm which corresponds to a laser standard class 3B defined by JIS C 6082. There is a risk that the eyes will remain damaged by directly seeing such a laser beam. In order to avoid such a risk, the reception optical amplifier 203 includes a laser safety function for automatically reducing the optical power level to about an optical power level at one wavelength (about +5 dBm or less) which corresponds to a class 1 standard, by detecting an output open of the optical fiber by reflected light. In FIG. 2, the laser safety function is realized using the optical coupler 206-1 and the laser safety part 205. The laser safety function in the optical amplifier as described above is disclosed in JP-A No. 200130/1997, JP-A No. 144687/2001, and JP-A No. 335214/2002.

In the configuration of FIG. 2, it is assumed that a failure occurs in the optical add-drop function part (East) 201-1 of the optical add-drop multiplexer 101-2 and the relevant function part is needed to be replaced. In this case, main signal interruption occurs in the two signals λ1, λ4 of the optical signals shown in FIG. 3, and main signal interruption should not occur in the optical signals λ2, λ3 that are originally not involved in the replacement. However, when the optical fiber 211 connected between the optical add-drop function part (West) 201-2 and the optical add-drop function part (East) 201-1 is removed, the laser safety part 205 detects an output open of the optical fiber by reflected light, thereby providing laser safety to the reception optical amplifier 203. Given the optical level per wavelength of +6 dBm in the output of the reception optical amplifier 203, the reception optical amplifier 203 of the optical amplification function part (West) 202-2 amplifies the three signals of λ1, λ2, λ3, so that the total optical power level of all the optical signals is +10.8 dBm. This will be reduced to +5 dBm because the laser safety functions due to removal of the optical fiber connected between the optical add-drop function parts. In other words, the optical power level per wavelength is reduced by 4.8 dB to +1.2 dBm, which has an impact on main signal continuity of the optical signals λ2 and λ3, causing main signal interruption. The above description has been made on the optical signals of three wavelengths. However, assuming that the present system is a system supporting 40 wavelengths, the optical level is reduced by up to 16 dB according to the calculation in the same way as described above.

The simplest way to solve the above problem is to insert an optical isolator into an input end from the reception optical amplifier of the optical add-drop function part. In this case, however, the laser safety does not function because the optical fiber is opened during the replacement of the optical add-drop function part. From the output of the reception optical amplifier to the fiber connected between the optical add-drop function parts, the optical loss occurs only in the optical isolator and the optical coupler, and their loss is at most about 2 dB in total. In the case of 40-wavelength system, the eyes may be damaged by directly seeing a maximum of +20 dBm during removal of the optical fiber 211 between the optical add-drop function parts. For this reason, in the method of inserting the optical isolator, it is necessary to have a structure in which a light blocking function such as an optical fiber connection shutter is provided to prevent the eyes from directly seeing the light from the optical fiber.

SUMMARY OF THE INVENTION

The present invention provides optical transmission equipment and an optical add-drop multiplexer that have no impact on a main signal without being involved in a maintenance operation for package replacement necessary due to a failure in the optical add-drop multiplexer.

The above described object can be achieved by optical transmission equipment including an optical amplification function part and an optical drop function part. The optical amplification function part includes: an optical amplifier connected to a transmission line to amplify the optical signal received from the transmission line; and a first laser safety part for controlling the optical amplifier based on the power of output light of the optical amplifier and on the power of reflected light to the first optical amplifier. The optical drop function part includes: an optical coupler connected to the optical amplification function part to split the optical signal received from the optical amplification function part; an optical demultiplexer for wavelength demultiplexing a first output optical signal of the optical coupler; a reflected light mask part for receiving a second output optical signal of the optical coupler as an input; and a second laser safety part for controlling the reflected light mask part based on the power of output light of the reflected light mask part and on the power of reflected light to the reflected light mask part.

Further the above object can be achieved by an optical add-drop multiplexer including: an optical amplification function part; an optical drop function part; an optical add function part; and a second optical amplifier connected to the optical add function part to amplify an optical signal received from the optical add function part. The optical amplification function part includes: a first optical amplifier connected to a transmission line to amplify an optical signal received from the transmission line; and a first laser safety part for controlling the first optical amplifier based on the power of output light of the first optical amplifier and on the power of reflected light to the first optical amplifier. The optical drop function part includes: an optical coupler connected to the optical amplification function part to split the optical signal received from the optical amplification function part; a first optical demultiplexer for wavelength demultiplexing a first output optical signal of the optical coupler; a reflected light mask part for receiving a second output optical signal of the optical coupler as an input; and a second laser safety part for controlling the reflected light mask part based on the power of output light of the reflected light mask part and on the power of reflected light to the reflected light mask part. The optical add function part includes: a second optical demultiplexer connected to the optical drop function part to wavelength demultiplex the optical signal received from the optical drop function part; plural optical switches for receiving the outputs of the second optical demultiplexer and receiving from an add optical port, as inputs; and an optical multiplexer for wavelength multiplexing the outputs of the plural optical switches.

Further the above object can be achieved by an optical add-drop multiplexer including: a reception optical amplification part including a first optical amplifier for amplifying received wavelength multiplexed light; an optical drop part for wavelength demultiplexing a portion of the wavelength multiplexed light; an optical add part for replacing the wavelength demultiplexed signals of the other portion of the wavelength multiplexed light; and a transmission optical amplification part including a second optical amplifier for amplifying the wavelength multiplexed light from the optical add part. The reception optical amplification part has an output portion provided with a first laser safety part for controlling the first optical amplifier by monitoring reflected light. Further the optical drop part has an output portion provided with a reflected light mask part for monitoring and masking reflected light, and with a second laser safety part for controlling the reflected light mask part.

BRIEF DESCRIPTION OF THE DRAWINGS

Preferred embodiments of the present invention will now be described in conjunction with the accompanying drawings, in which.

DETAILED DESCRIPTION OF THE PREFERRED EMBODIMENTS

Modes for carrying out the invention will be described below based on preferred embodiments with reference to the accompanying drawings. Like parts are given like reference numbers and their description will not be repeated.

Embodiment 1

Figure 4:
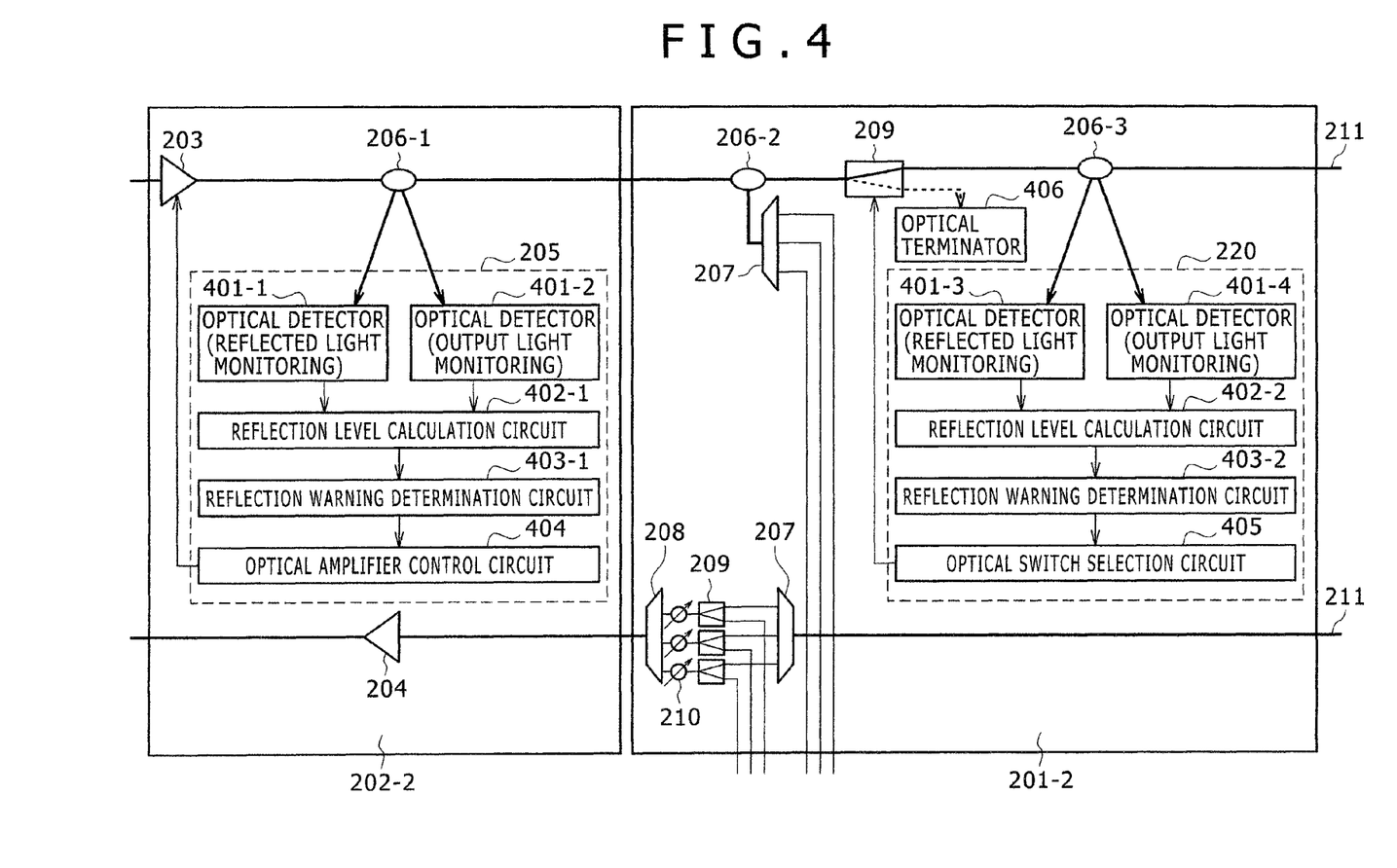
FIG. 4 is a block diagram showing a principal part of an optical add-drop multiplexer.
Figure 5:
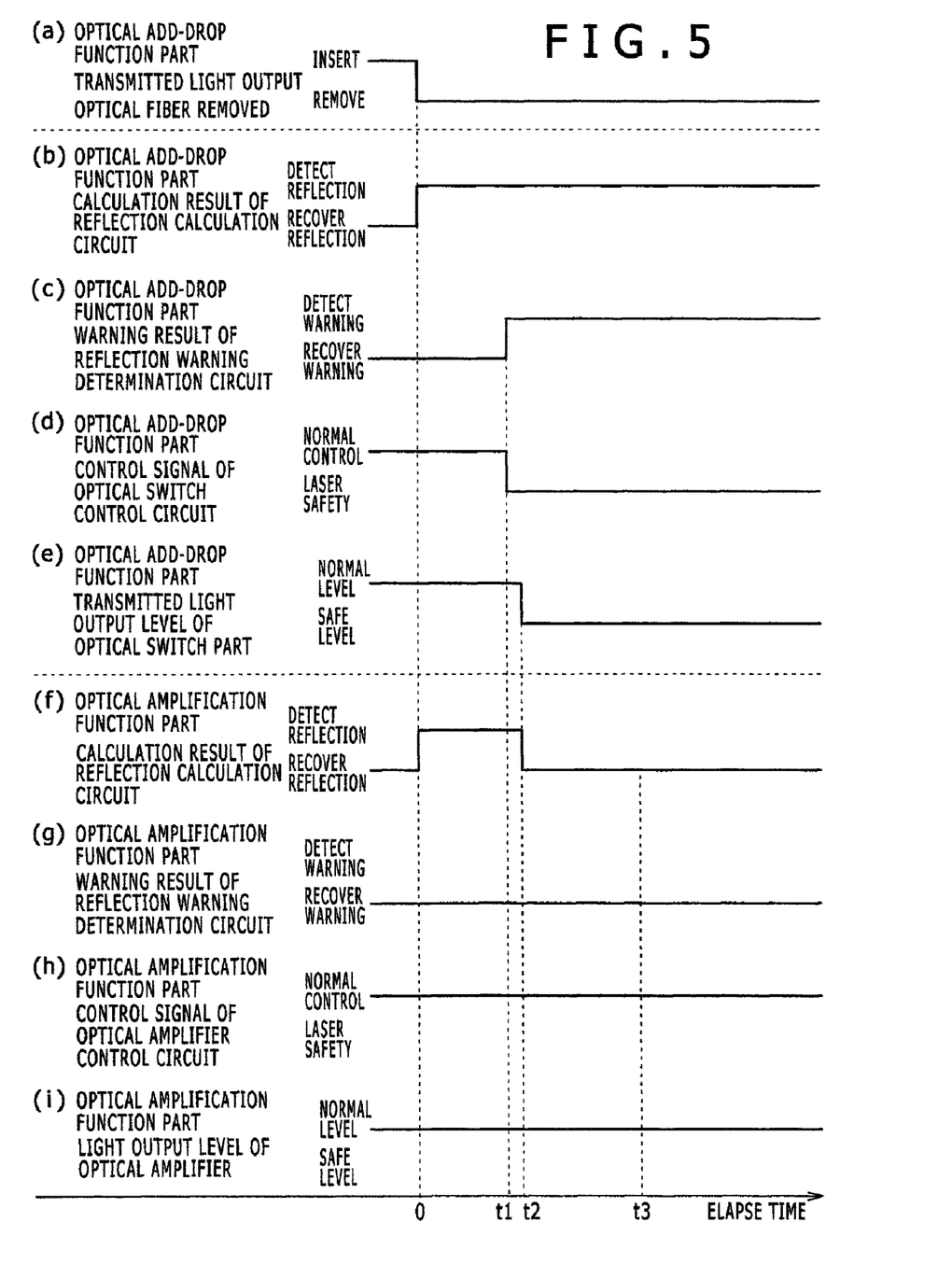
FIG. 5 is a time chart illustrating the device operation when a transmission optical fiber of an optical add-drop function part is removed.

A first embodiment will be described with reference to FIGS. 4 and 5. Here, FIG. 4 is a block diagram showing a principal part of an optical add-drop multiplexer. FIG. 5 is a time chart illustrating the device operation when a transmission optical fiber of an optical add-drop function part is removed.

FIG. 4 shows an optical amplification function part and an optical add-drop function part, both only on West side in the optical add-drop multiplexer. As for optical parts, an optical switch 209, an optical coupler 206-3, a reflected light monitoring optical detector 401-3, an output light monitoring optical detector 401-4, and an optical terminator 406 are added to a transmitted light output end of an optical add-drop function part 201-2. Here, the optical coupler 206-3 splits the optical signal to the optical fiber 211 and to the optical detector 401-4, while splitting the reflected light to the optical switch 209 and to the optical detector 401-3. The optical terminator 406 is an optical attenuator.

In the optical add-drop function part 201-2, the optical signal is converted by the output light monitoring optical detector 401-4 into an electrical signal that is proportionate to the output light power from the optical add-drop function part 201-2, and the optical signal is converted by the reflected light monitoring optical detector 401-3 into an electrical signal that is proportionate to the reflected light power upon removal of the optical fiber 211 connected between the optical add-drop function parts. Then the amount of reflection is calculated in a reflection level calculation circuit 402-2 by the monitor results of the optical detectors. The reflection level calculation circuit 402-2 performs the following calculation:

$$\text{Amount of reflection} = \text{Reflected light power} / \text{Output light power} \quad (1)$$

If no output light power is given, the calculation circuit outputs a certain fixed amount of reflection without performing the above calculation process. This is to continue warning even when the output light power is absent. A reflection warning determination circuit 403-2 periodically monitors the calculation result of the calculation circuit at an interval of 1 ms, and transmits a reflection warning to an optical switch selection circuit 405 when the amount of reflection exceeds a reference value for a predetermined time period. Upon detection of the warning, the optical switch selection circuit 405 performs switching of the optical switch 209 so that the optical signal proceeds to the optical terminator 406. The principle of reflection warning detection in the reception optical amplifier 203 of the optical amplification function part 202-2 is exactly the same as in the case of the optical add-drop function part. The laser safety circuit 205 of the reception optical amplifier 203 is different from the laser safety circuit of the optical add-drop function part 201-2, in only a point that an optical amplifier control circuit 404 is provided instead of the optical switch selection circuit 405. The reception optical amplifier 203 controls the output power to be constant by reducing the output of the optical amplifier to a safe level by the optical amplifier control circuit 404, instead of switching the optical switch upon detection of the reflection warning due to removal of the fiber.

In FIG. 5, (a) shows the state of the output fiber of the optical add-drop function part, (b) shows the calculation result of the reflection calculation circuit, (c) shows the output of the reflection warning determination circuit, (d) shows the control signal output of the optical switch control circuit, (e) shows the transmitted light output level of the optical switch part, (f) shows the calculation result of the reflection calculation circuit of the optical amplification function part, (g) shows the output of the reflection warning determination circuit, (h) shows the control signal output of the optical amplifier control circuit, and (i) shows the output level of the optical amplifier.

In FIG. 5, the optical fiber 211 connecting the optical add-drop function parts is removed at time 0. At the same time of the removal of the optical fiber 211, the calculation result of the reflection calculation circuit of the optical add-drop function part and the calculation result of the reflection calculation circuit in the optical amplification function part are raised to their reflection detections, respectively. After time t1 when the reflection calculation result of the optical add-drop function part 201-2 reaches the reflection warning detection level, the warning detection is actually determined by the reflection warning determination circuit 403-2. Here, t1 represents a protection time. Similarly, time t3 represents a protection time from when the reflection calculation result of the optical amplification function part 202-2 reaches the reflection warning determination level to when the warning detection is actually determined. Here, t1 is sufficiently smaller than t3. Time t2 represents a time when the switching of the optical switch is completed in the optical add-drop function part 201-2 and when the optical signal is terminated in the optical terminator. Accordingly the value of t2−t1 is an actual switching time on the optical switch hardware. Incidentally t1 and t3 are set by a timer of the reflection warning determination circuit 403.

When the optical fiber is removed at time 0, the optical add-drop function part 201-2 and the optical amplification part 202-2 detect at substantially the same time that the reflection calculation result reaches the reflection warning detection level in the reflection level calculation circuit 402. The optical add-drop function part 201-2 and the optical amplification function part 202-2 operate differently after the reflection calculation. The optical add-drop function part 201-2 transmits a reflection warning by the reflection warning determination circuit 403-2 after the protection time t1 when the reflection result reaches the reflection warning detection level, and then moves to laser safety operation by optical switch selection operation. On the other hand, the optical amplification function part 201-2 does not detect the reflection warning because the reflection calculation result does not reach the protection time t3 at the time when the protection time t1 has passed, and remains in the normal mode of operation without moving to laser safety operation to the optical amplifier. At time t2 when the optical switch selection operation is completed, the optical add-drop function part 201-2 is still detecting the reflection warning. However, the optical amplification function part 202-2 does not detect the reflected light as the light is terminated in the optical add-drop function part 201-2, in which the reflection calculation result is below the reflection warning detection level. At time t2 when the reflection calculation result does not reach the protection time t3 of the reflection warning detection in the optical amplification function part 202-2, the optical amplification function part continues normal operation without entering at all the laser safety operation which is performed in response to the detection of reflected light.

Incidentally, when the transmitted light level in the optical switch part is reduced to the safe level and the output light power is "0" in the reflection calculation circuit of the optical add-drop function part, the reflection calculation circuit outputs a certain fixed amount of reflection. As a result, the optical add-drop function part continues to detect the warning.

In the case of using a mechanical optical switch as the optical switch 209, the switching time, t2–t1, in the optical switch 209 is about 1 ms. Assuming that t1 is 5 ms, the time needed for the optical add-drop function part 201-2 to move to the laser safety operation is 6 ms. Accordingly the protection time t3 of the reflection warning detection in the optical amplification function part 202-2 can be determined to 60 ms which is ten times larger than 6 ms. Incidentally 60 ms is a sufficiently short time as an exposure time of the eyes to the class 3B laser.

By applying the embodiment to the optical add-drop multiplexer 101-2 in the network configuration shown in FIG. 2, even when the optical fiber 211 connecting the optical add-drop function parts is removed for package replacement necessary due to a failure in the optical add-drop function part (East) 201-1, the maintenance operation can be performed without having any impact on the optical signals λ2, λ3 that are originally not involved in the package replacement because the optical amplification function part (West) 202-2 does not enter the laser safety operation. In addition, there is no risk that the eyes will be damaged by directly seeing the optical fiber as the transmitted light output of the optical add-drop function part (West) 202-2 is terminated by the optical switch 209. However, once the optical add-drop function part 202-2 enters the laser safety, the light is perfectly terminated and the reflection warning recovery will not be detected any more. For this reason, it is necessary to return the optical switch to the normal line by an operator operation when the maintenance operation is completed.

Incidentally FIG. 2 shows an example of the two-way network, but the embodiment can be applied to transmission equipment for one-way transmission lines. This is the same in a second embodiment. The optical switch 209 and the optical terminator 406 can be a reflected light mask part for preventing the reflected light from being seen by the optical amplification function part 202-2.

According to the embodiment, the laser safety can be operated solely by the optical add-drop function part, without being operated by the optical amplification function part. Because of this feature, even when the optical fiber is removed in order to replace the optical add-drop function part in the maintenance operation, there is no impact on the optical signals that are not involved in the maintenance operation at all as the laser safety is not operated in the optical amplification function part. In addition, it is possible to eliminate the risk of damaging the eyes by directly seeing high power output light during the maintenance operation.

Embodiment 2

Figure 6:
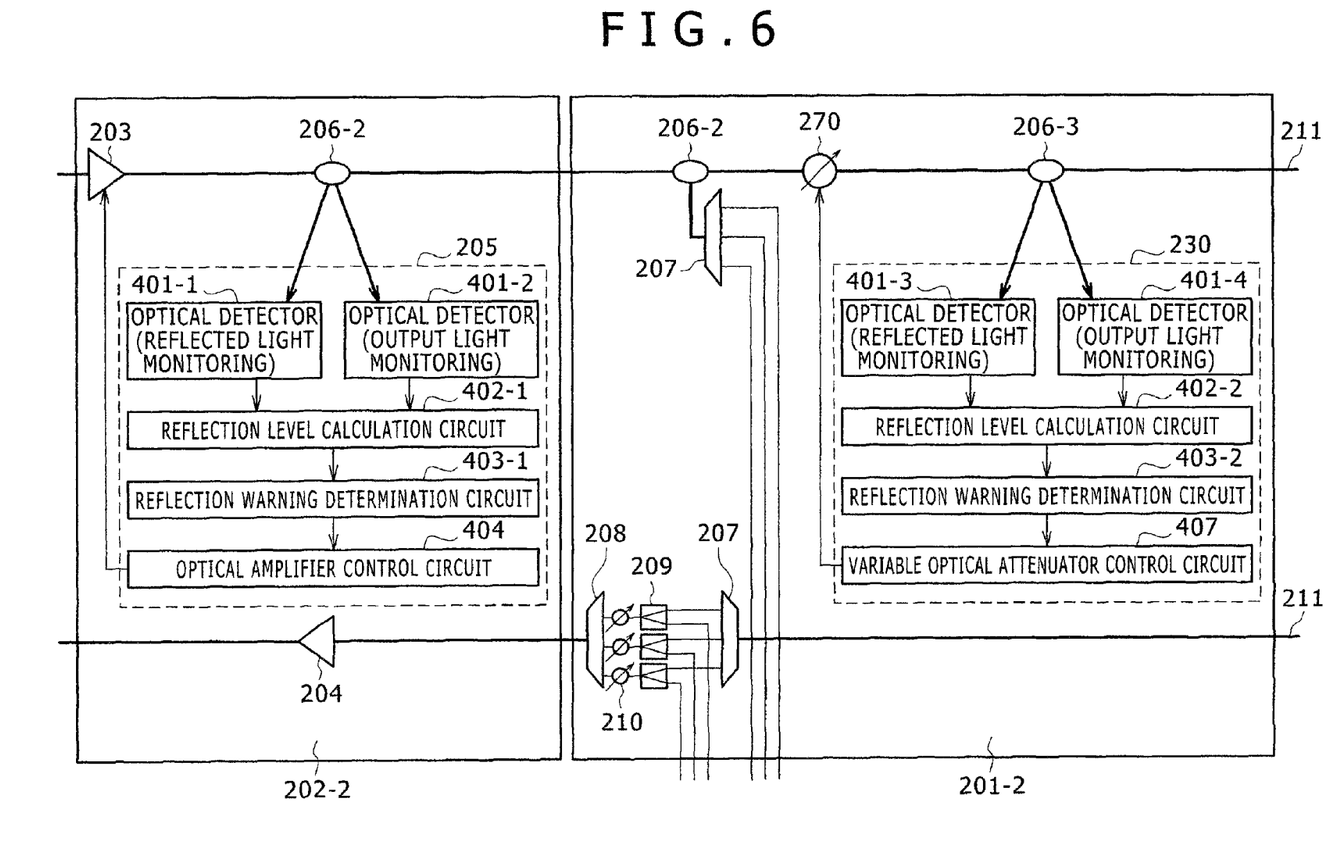
FIG. 6 is a block diagram showing a principal part of the optical add-drop multiplexer.

A second embodiment will be described with reference to FIG. 6. Here, FIG. 6 is a block diagram showing a principal part of an optical add-drop multiplexer. The differences from the optical add-drop multiplexer shown in FIG. 4 are that the optical termination function of the optical add-drop function part 201-2 is realized by a variable optical attenuator 270 instead of by the optical switch 209 and the optical terminator 406, and that the optical switch selection circuit 405 of the laser safety 220 is replaced with a variable optical attenuator control circuit 407 of a laser safety 230.

The operation principle itself is substantially the same as in the first embodiment. Only the difference is that when the reflection warning is detected, the signal light is terminated by increasing the attenuation amount of the variable optical attenuator 270 to about 20 dB at once, instead of being terminated by switching the optical switch.

When a thermo-optic variable optical attenuator is used as the variable optical attenuator 270, the attenuation amount change time, t2–t1, in the variable optical attenuator is about 50 ms. Assuming that the protection time t1 of the reflection warning detection in the optical add-drop function part is 5 ms, the time needed for the optical add-drop function part to move to the laser safety operation is 55 ms. Accordingly it is necessary to determine the protection time t3 of the reflection warning detection in the optical amplification function part to about 550 ms which is about ten times larger than 55 ms. Incidentally 550 ms is a sufficiently short time as an exposure time of the eyes to the class 3B laser. The variable optical attenuator 270 can be a reflected light mask part for preventing the reflected light from being seen by the optical amplification function part 202-2.

Also according to the embodiment, the laser safety can be solely controlled by the optical add-drop function part, without being controlled by the optical amplification function part. Because of this feature, even when the optical fiber is removed in order to replace the optical add-drop function part in the maintenance operation, there is no impact on the optical signals that are not involved in the maintenance operation as the laser safety is not operated in the optical amplification function part. In addition, it is possible to eliminate the risk of damaging the eyes by directly seeing high power output light during the maintenance operation.

As compared to the first embodiment, the advantage of the second embodiment is that the transmitted light is not perfectly blocked but is only attenuated by 20 dB in the termination by the variable optical attenuator 270. Because the transmitted light is not perfectly blocked as described above, the refection warning recovery can be detected when the optical fiber, which has been removed during the maintenance, is returned to the original position. Thus, unlike the first embodiment, it is possible to automatically return to the normal operation without the need for operator operation, when the maintenance operation is completed.

According to the present invention, it is possible to provide optical transmission equipment and an optical add-drop multiplexer that have no impact on a main signal without being involved in a maintenance operation for package replacement necessary due to a failure in the optical transmission equipment or in the optical add-drop multiplexer.

We claim:

1. An optical transmission equipment comprising:
   an optical amplifier that is coupled to an optical transmission path and amplifies a first optical signal which is received from the optical transmission path;
   a first controller that controls the optical amplifier depending on a first optical power of output light from the optical amplifier and a second optical power of reflecting light toward the optical amplifier;
   an optical coupler that branches a second optical signal from the optical amplifier into a first output and a second output;
   an optical demultiplexer that demultiplexes the first output of the optical coupler;
   an optical switch that receives the second output of the optical coupler; and
   a second controller that controls the optical switch depending on a third optical power of output light from the optical switch and a fourth optical power of reflecting light to the optical switch.

2. An optical transmission equipment, according to claim 1, further comprising:
   an optical attenuator that receives a third optical signal via the optical switch under control of the second controller.

3. An optical transmission equipment, according to claim 2, wherein the optical attenuator is an optical terminator.

4. An optical transmission equipment, according to claim 2, wherein the second controller is configured to control the optical switch to avoid optical incidence toward the optical amplifier.

5. An optical transmission equipment, according to claim 1,
   wherein the first controller generates a first reflection warning when the second optical power of reflecting light toward the optical amplifier exceeds a first predetermined value, and after a first predetermined time period determines detection of the first reflection warning;
   wherein the second controller generates a second reflection warning when the fourth optical power of reflecting light toward the optical switch exceeds a second predetermined value, and after a second predetermined time period determines detection of the second reflection warning; and
   wherein said first predetermined time period is longer than said second predetermined time period.

6. An optical transmission equipment, according to claim 5, further comprising:
   an optical attenuator that receives a third optical signal via the optical switch under control of the second controller;
   wherein said second controller performs switching of the optical switch to the optical attenuator.

7. An optical transmission equipment comprising:
   an optical amplifier that is coupled to an optical transmission path and amplifies a first optical signal which is received from the optical transmission path;
   a first controller that controls the optical amplifier depending on a first optical power of output light from the optical amplifier and a second optical power of reflecting light toward the optical amplifier;
   an optical coupler that branches a second optical signal from the optical amplifier into a first output and a second output;
   an optical demultiplexer that demultiplexes the first output of the optical coupler;
   a variable optical attenuator that receives the second output of the optical coupler; and
   a second controller that controls the variable optical attenuator depending on a third optical power of output light from the variable optical attenuator and a fourth optical power of reflecting light toward the variable optical attenuator.

8. An optical transmission equipment, according to claim 7, wherein the second controller is configured to control the variable optical attenuator to avoid optical incidence toward the optical amplifier.

9. An optical transmission equipment, according to claim 7, wherein the second controller is configured to control the variable optical attenuator by controlling an attenuation amount of the variable optical attenuator to avoid optical incidence toward the optical amplifier.

10. An optical transmission equipment, according to claim 7, wherein the second controller is configured to control the variable optical attenuator so that the transmitted light is not perfectly blocked.

11. An optical transmission equipment, according to claim 7,
    wherein the first controller generates a first reflection warning when the second optical power of reflecting light toward the optical amplifier exceeds a first predetermined value, and after a first predetermined time period determines detection of the first reflection warning;
    wherein the second controller generates a second reflection warning when the fourth optical power of reflecting light toward the variable optical attenuator exceeds a second predetermined value, and after a second predetermined time period determines detection of the second reflection warning; and
    wherein the first predetermined time period is longer than the second predetermined time period.

12. An optical transmission equipment, according to claim 11, wherein the second controller increases the attenuation amount of the variable optical attenuator when the detection of the second reflection warning is determined.

* * * * *